United States Patent [19]
McGuire

[11] Patent Number: 6,075,872
[45] Date of Patent: Jun. 13, 2000

[54] PROCESS FOR ILLUMINATING ARTWORK

[75] Inventor: Kevin P. McGuire, Rochester, N.Y.

[73] Assignee: Tailored Lighting Inc., Rochester, N.Y.

[21] Appl. No.: 09/193,360

[22] Filed: Nov. 17, 1998

Related U.S. Application Data

[63] Continuation-in-part of application No. 08/923,563, Sep. 4, 1997, Pat. No. 5,977,694.
[51] Int. Cl.[7] ...................................................... G06K 9/60
[52] U.S. Cl. ............................ 382/100; 382/283; 353/28; 353/63; 362/351; 359/885
[58] Field of Search ..................................... 382/100, 112, 382/190, 191, 260, 261, 325, 285, 282, 283; 353/63, 28, 84; 362/1, 2, 351; 348/370; 359/885, 361; 250/503.1; 313/112; 356/402, 416; 40/700

[56] References Cited

U.S. PATENT DOCUMENTS

| | | | |
|---|---|---|---|
| 3,912,859 | 10/1975 | Christopherson | 348/169 |
| 4,217,047 | 8/1980 | Jacksen et al. | 353/28 |
| 4,347,461 | 8/1982 | Carlson | 315/158 |
| 4,713,493 | 12/1987 | Ovshinsky | 136/249 |
| 4,887,898 | 12/1989 | Halliburton et al. | 353/28 |
| 4,991,970 | 2/1991 | Darboux et al. | 356/402 |
| 5,044,736 | 9/1991 | Jaskie et al. | 359/291 |
| 5,371,963 | 12/1994 | Gallagher | 40/700 |
| 5,467,404 | 11/1995 | Vuylsteke et al. | 382/274 |
| 5,838,451 | 11/1998 | McCarthy | 356/402 |
| 5,845,001 | 12/1998 | Thomas | 382/100 |
| 5,864,364 | 1/1999 | Ohyama et al. | 348/211 |

OTHER PUBLICATIONS

Cuttle, "Damage to Museum objects Due to Light Exposure." Lighting Res. Technol., 28(1), pp. 1–9, Jan. 1996.
Cuttle, "Lighting Works of Art for Exhibition and Conservation." Lighting Res. Technol., 20(2), pp. 43–53, Feb. 1988.
Saunders, "Ultra–Violet Filters for Artificial Light Sources," National Gallery Technical Bulletin, vol. 13, 8 pages, Jan. 1989.

Primary Examiner—Jon Chang
Attorney, Agent, or Firm—Howard J. Greenwald

[57] ABSTRACT

A process for illuminating an object with a first spectrally distinct area. In the first step of the process, the spectral reflectivity of a first spectrally distinct area is determined, and that wavelength portion(s) of the spectrally distinct area that reflects more light form a light source than absorbs it (and the extent to which it does so) is identified. Thereafter, the maximum reflectivity of such wavelength portion, after illumination by the light source, is identified, and one also identifies that segment of the first wavelength portion which has a reflectivity of less than a specified percentage of the maximum reflectivity. A digitized image is then prepared which is modified to delete the low reflectivity segment of the first wavelength portion. The modified digital image is then fixed onto a medium (which may be, e.g., a color slide), the medium is illuminated with the light source, and the light image thus produced is projected onto the object.

20 Claims, 8 Drawing Sheets

FIG.4A3

PROCESS FOR ILLUMINATING ARTWORK

REFERENCE TO RELATED PATENT APPLICATION

This application is a continuation-in-part of applicant's patent application U.S. Ser. No. 08/923,563, filed on Sep. 4, 1997 now U.S. Pat. No. 5,977,694.

FIELD OF THE INVENTION

A process for illuminating artwork which minimizes damage to such artwork caused by absorption of radiant energy while maintaining color rendition.

BACKGROUND OF THE INVENTION

It has been known since 1888 that light causes artists pigments to fade, and different light sources vary in the manner in which they affect the rate of fading. In 1888, in an article by W. J. Russel and W. de W. Abney entitled "Action of light on water-colours" (Report to the Science and Art Department of the Committee of Council on Education, HMSO, London, 1888), the authors described a series of experiments they conducted on different light sources and the extent to which they caused fading of artists pigments.

Concern about this phenomenon intensified in the 1950's. Thus, for example, L. S. Harrison, in a "Report on the Deteriorating Effects of Modern Light Sources" (Metropolitan Museum of Art, New York, 1953) tabulated data from a National Bureau of Standards report and disclosed that damage tended to increase with decreasing wavelength.

In 1986, T. Kenjo, in an article entitled "Certain deterioration factors for works of art and simple devices to monitor them" (International Journal of Museum Management and Curatorship May, 1986, at pages 295–300) described studies he had conducted into the effects of radiation at seven wavelengths (from 390 nanometers to 700 nanometers) on six different colorants. However, although Kenjo further discussed the problem of this phenomenon, he did not suggest a satisfactory solution.

To the best of applicant's knowledge, no satisfactory solution has been developed for this problem. The most common solution used is to control the overall illumination and/or annual exposure of the artwork to a level appropriate for the most sensitive materials present therein; see, e.g., G. Thompson, "The Museum Environment," $2^{nd}$ Edition (Butterworths, London, 1986), at pages 22–34. However, the illumination used for this "solution" does not provide an adequate light level and/or color balance for the proper viewing of the artwork.

Another common solution is to minimize the amount of ultra-violet radiation which is allowed to impact the artwork. Although this solution is partially effective, it does nothing to affect the damage done by visible part of the light spectrum It is an object of this invention to provide a process for illuminating artwork which produces an aesthetically pleasing and accurate display of the artwork while simultaneously minimizing damage to the artwork from radiant energy.

SUMMARY OF THE INVENTION

In accordance with this invention, there is provided a process for illuminating artwork. In the first step of this process, the spectral reflectivity of the artwork to be illuminated is measured for the distinctive colors in the artwork. Thereafter, an image is made of the artwork, and the image is then modified to diminish the transmission of unwanted wavelengths and/or to allow desirable levels of transmission for desired wavelengths when the image is illuminated by a specified light source. The modified image is then transferred to suitable media, and the media thus produced is used in a projection system to illuminate the artwork. The projection system contains means for determining the radiant energy which is impacting the artwork and the extent to which the media is degrading, and it is also capable of modifying the position of selected portions of such radiant energy.

BRIEF DESCRIPTION OF THE DRAWINGS

The claimed invention will be illustrated by reference to the following drawings, in which like numbers refer to like elements, and in which:

FIGS. 4A1 through 4G are graphs illustrating how the unmodified image of FIG. 2 may be modified, and spectral output is produced by illuminating such modified image;

DESCRIPTION OF THE PREFERRED EMBODIMENT

Figure 1:
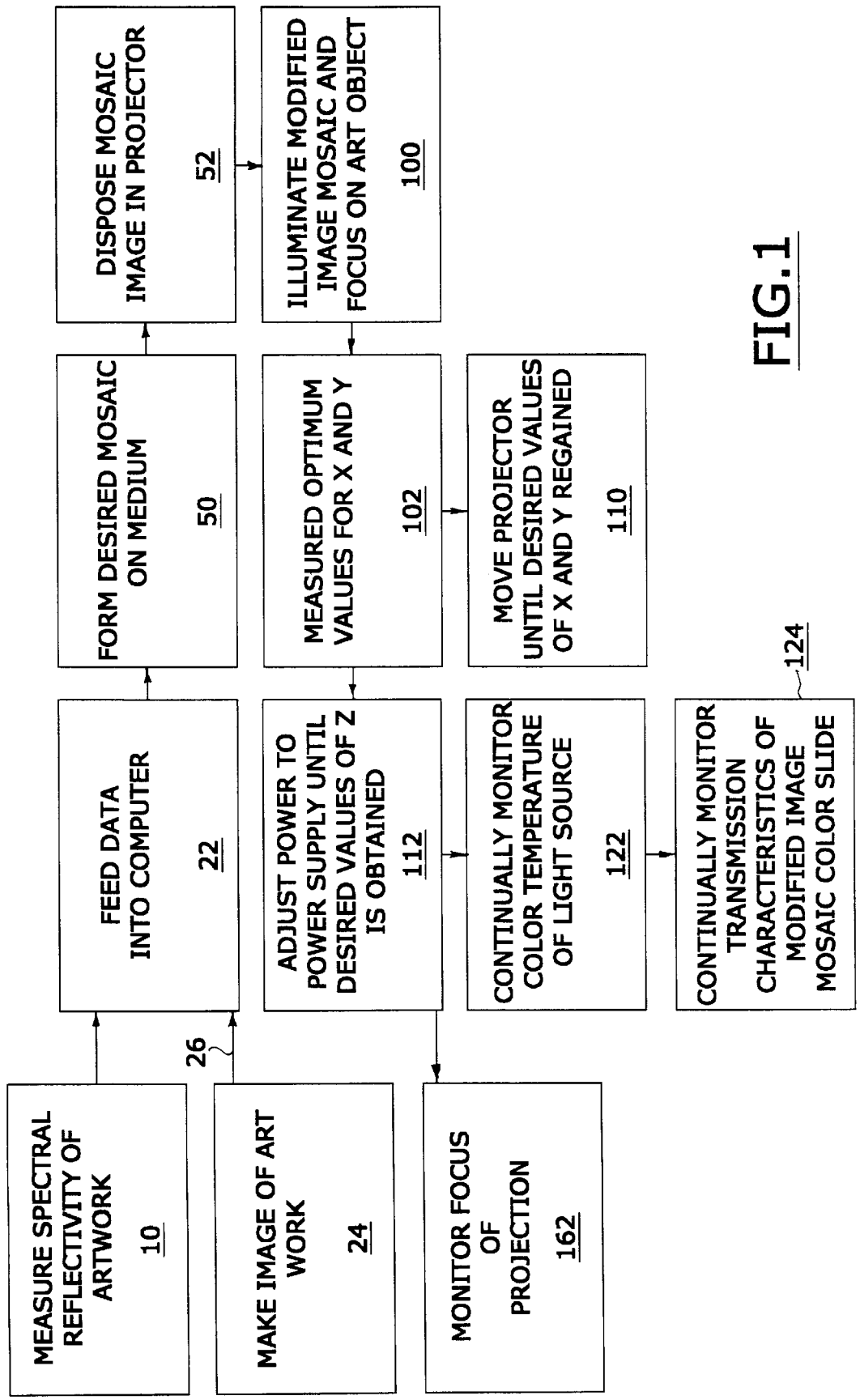
FIG. 1 is a flow chart of one preferred process of the invention.

FIG. 1 is a flow chart of one preferred process of this invention. Referring to FIG. 1, in step 10 the spectral reflectivity of the artwork to be illuminated is first measured.

The process of this invention is especially suitable for illuminating paintings in museums or art galleries, especially those which are older and more subject to degradation. Many of these paintings are worth many millions of dollars, and their continued viability as art objects is threatened by continual exposure to normal illumination sources.

However, as will be readily apparent to those skilled in the art, the process of this invention also may be used to illuminate other objects of art, such as sculptures, objects made from wood, paper, and textiles, etc.

By way of illustration, one such artwork is the star spangled banner, which is the American flag which flew over Fort McHenry in 1814 and which Francis Scott Key memorialized in the "Star Spangled Banner." Several millions of dollars are now being spent to restore and preserve this national treasure. The process of this invention will allow such flag to be properly displayed with minimal degradation.

Figure 2:
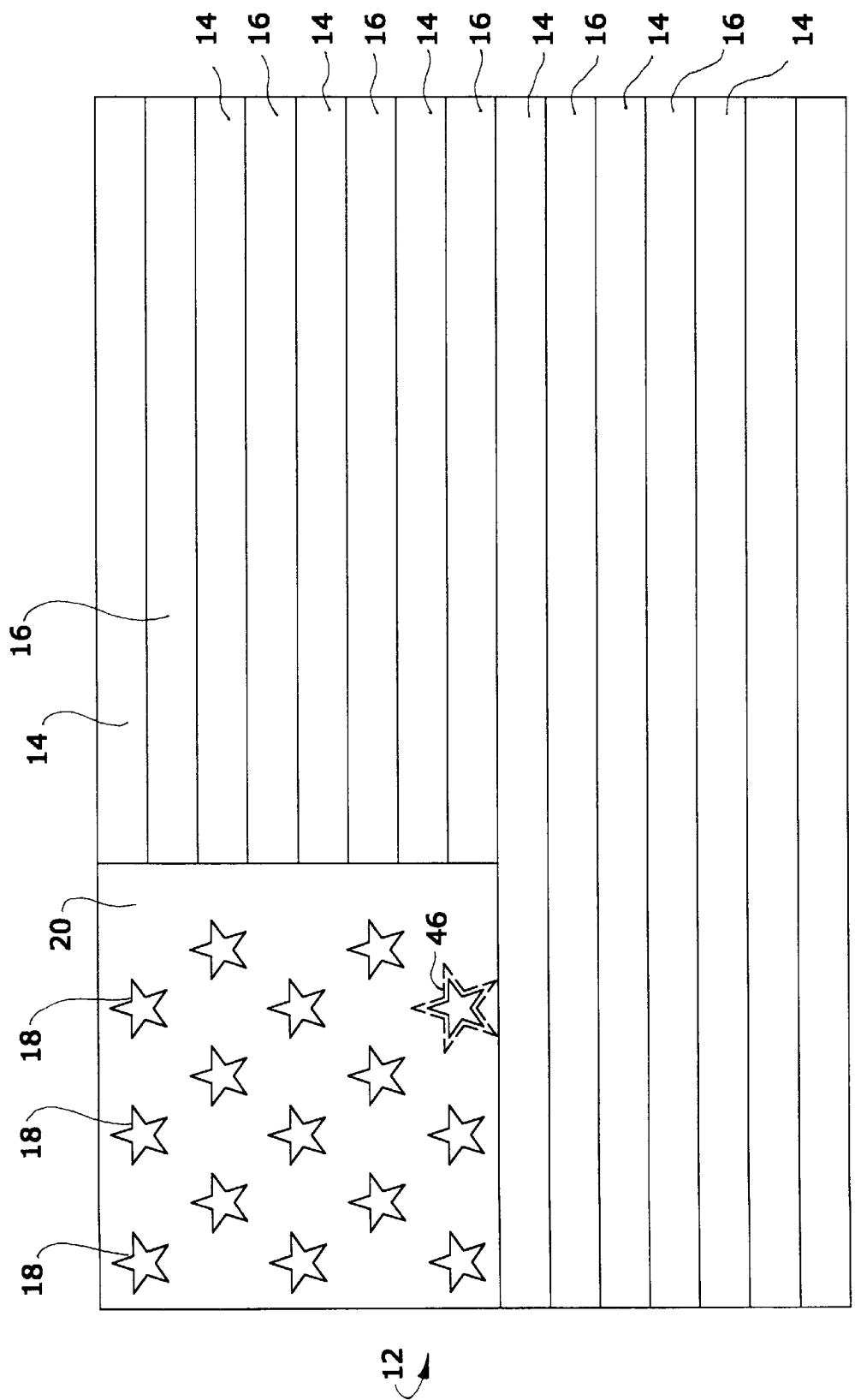
FIG. 2 is a schematic representation of an image of a particular artwork.

FIG. 2 is a schematic representation of "Old Glory." Referring to FIG. 2, it will be seen that flag 12 is comprised of a multiplicity of red stripes 14, white stripes 16, white stars 18, and a blue background 20. Thus, it is apparent that the significant colors in this flag are red, the white of the stripes 16, the white of stars 18 (which may be the same, or different), and the blue of background 20. In step 10 of the process depicted in FIG. 1, the spectral reflectivities of each of these colored areas is measured.

Such spectral reflectivities may be measured by means well known to those skilled in the art. Thus, by way of illustration and not limitation, one may use the devices and/or processes described in U.S. Pat. Nos. 5,718,773, 5,630,886, 5,596,886, reissue 35,416, 5,585,158, 5,514,534, 5,395,745, and the like. The disclosure of each of these United States patents is hereby incorporated by reference into this specification.

By way of further illustration, one may measure the spectral reflectivities of the art object with the use of a spectrophotometer sold by the Perkin-Elmer Corporation of Norwalk, Conn. as model number Lambda 900 UV/VIS/NIR.

Referring again to FIG. 1, after the spectral reflectivities of the desired areas of flag 10 have been measured, in step 22 the data regarding such reflectivities is fed into a digital computer equipped with image manipulation software adapted to modify the transmission properties of an image. Such software is readily commercially available. Thus, by way of illustration, one may use software such as, e.g., GNU image manipulation software (GIMP), Adobe Photoshop, and the like. Thus, by way of further illustration, one may use the software, processes, and/or devices described in U.S. Pat. Nos. 5,832,119, 5,822,436, 5,768,426, 5,748,783, 5,748,763, 5,748,264, 5,845,604, 5,710,834, 5,636,292, and the like. The disclosure of each of these United States patents is hereby incorporated by reference into this specification.

Thereafter, in step 24 of the process (see FIG. 1), an image is made of the artwork. The initial image may be made by conventional means such as, e.g., photography. In one preferred means, a digital camera is used to make a digital image of the artwork. One may use any of the digital camera which are readily commercially available to make a digitized image of the artwork 12. Thus, by way of illustration and not limitation, one may use one or more of the processes and/or devices described in U.S. Pat. Nos. 5,835,807, 5,835,801, 5,835,722, 5,835,627, 5,835,616, 5,835,435, 5,835,413, 5,835,238, 5,835,099, 5,835,034, 5,834,821, 5,833,785, 5,832,463, 5,832,119, and the like. The disclosure of each of these United States patents is hereby incorporated into this specification by reference.

The digitized image produced in step 24 is preferably fed into the computer via line 26. Thereafter, the digitized image is modified.

In one embodiment, the image is modified so that it transmits less than the entire spectrum for a particular color but enough to transmit the light onto the object so that, when the object is viewed, it appears as though it is being illuminated by unfragmented white light.

Figure 3:
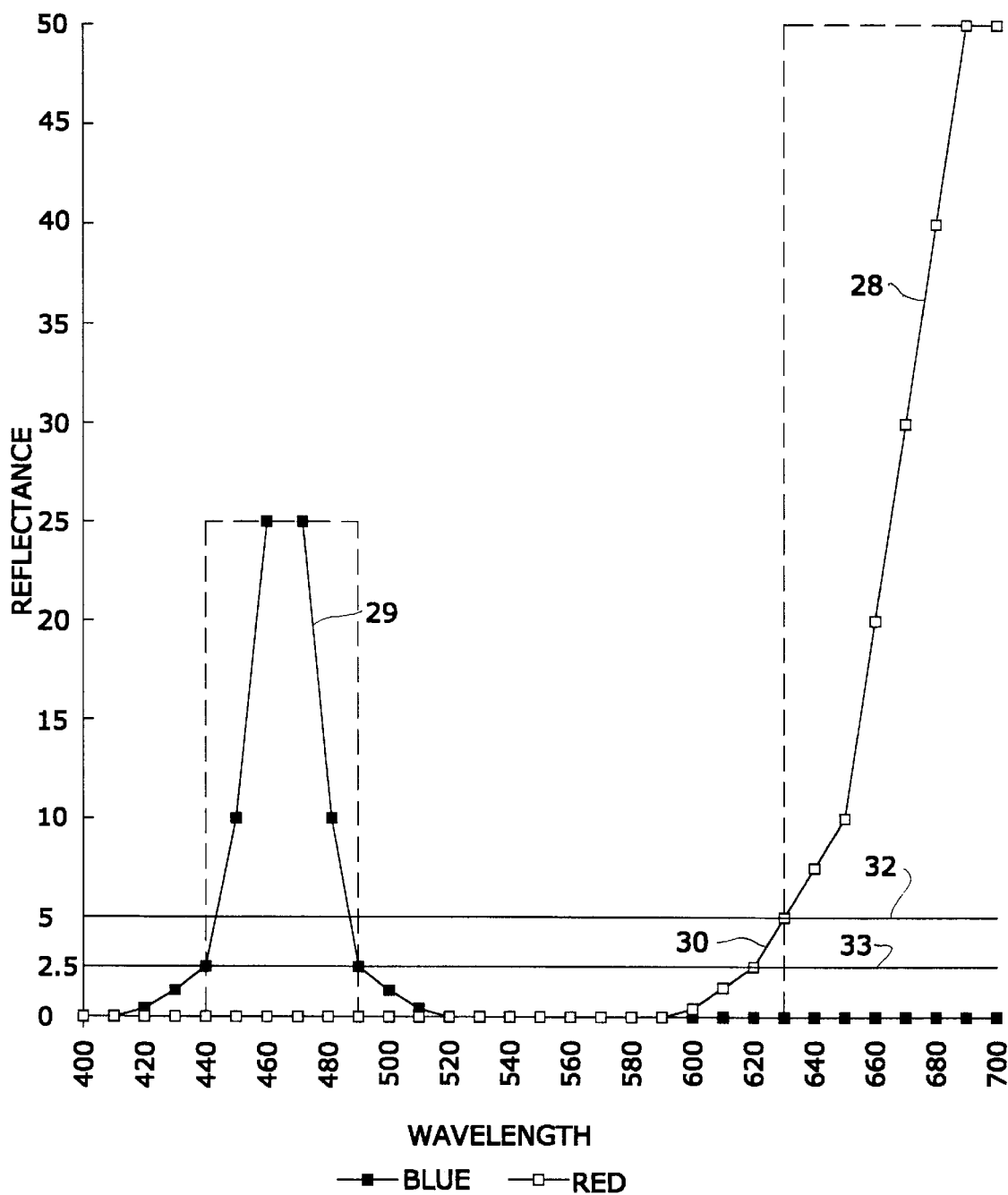
FIG. 3 is a graphical representation of two spectral reflectances taken from a particular artwork.

FIG. 3 is a graph of the reflectance of the red stripes 14 of flag 12 versus wavelength. It will be seen that the reflectance curve 28 produced extends from a wavelength of about 600 nanometers to a wavelength of visible wavelength of about 700 nanometers.

When normal, unfragmented white light is used as a illumination source, all of these radiant energy depicted by this curve would be reflected or absorbed proportionately by the red portions of the art object. The portion 30 below line 32 will be primarily absorbed by the red portions of the art object; approximately 95 percent of portion 30 will be absorbed, whereas only 5 percent of such portion will be reflected. As indicated elsewhere in this specification, the portion 30 of the curve does substantially more to damage the art object than to enhance its viewability.

Consequently, a judgement is made with regard to various portions of the curve 28 as to whether the image should be modified so as to delete substantially useless but potentially harmful radiation portions of the curve. In the embodiment depicted in FIG. 3, all radiation which is reflected less than about 10 percent is deleted from the modified image. As will be apparent, a trade off is involved between viewability and degradation, and different levels of reflectivity may be chosen as the cut off line 32.

FIG. 3 also contains a graph 29 of the reflectance for blue objects 20. It will be noted that the reflectance of the blue objects is less than the reflectance of the red objects and, thus, the ten percent cutoff line 33 is positioned differently than the 10 percent cut off line 32 used for the red objects. The same exercise is engaged in for each of the other colors and objects in the flag 10. It is preferred, however, that the amount of radiant energy transmitted for each color in the modified image be in substantially the same ratio to replicate the original light source used to illuminate the object.

FIG. 4A1 illustrate the spectra produced by a 3500 degree Kelvin "SOLUX" light source which is sold by the Tailored Lighting, Inc. of 1350 Buffalo Road, Rochester, N.Y. 14624; in these graphs, the normalized output versus wavelength is plotted. This light source is described and claimed in U.S. Pat. Nos. 5,418,419 and 5,666,017, the entire disclosures of which are hereby incorporated by reference into this specification. In general, a light source with a color temperature of from about 3,300 to about 3,700 degrees Kelvin may advantageously be used.

In one embodiment, the light source used is so constructed that less than about 1 percent of its radiant energy is comprised of light with wavelengths of from 280 to about 380 nanometers, and more preferably less than about 0.01 percent of its radiant energy is comprised of such light. It is also preferred that less than about 20 percent of its radiant energy is comprised of light with a wavelength of from about 780 to about 2,000 nanometers and, more preferably, less than about 10 percent of its radiant energy is comprised of such light.

Figure 4B:
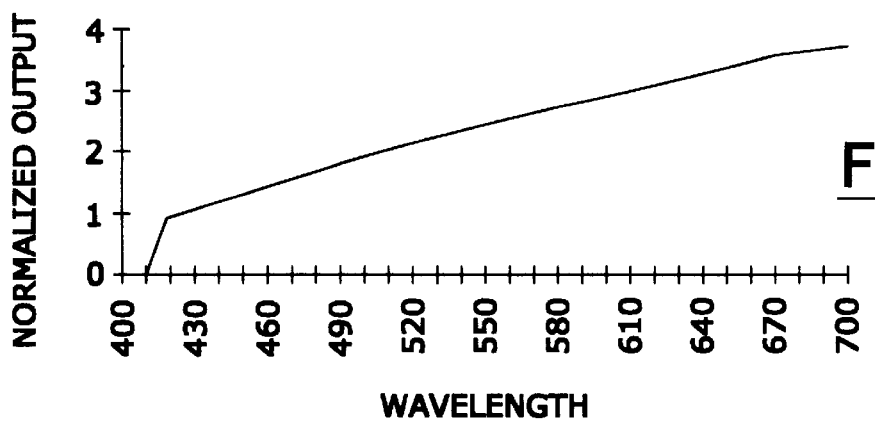
Figure 4B:
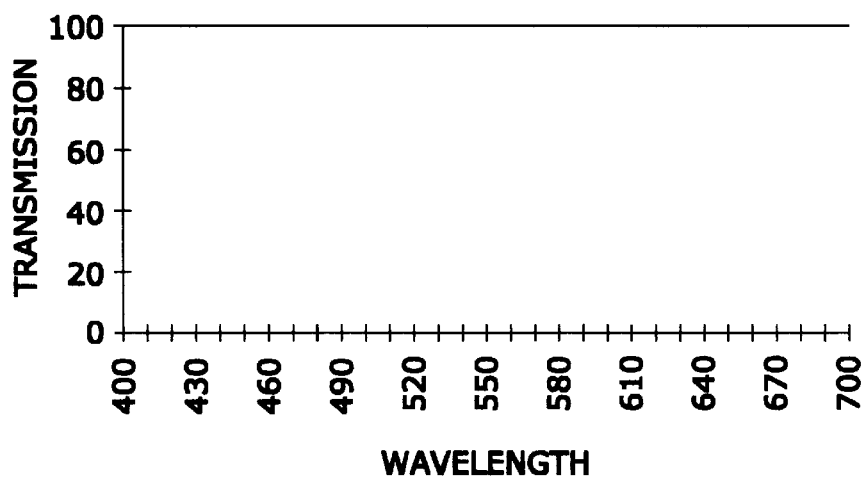
Figure 4C:
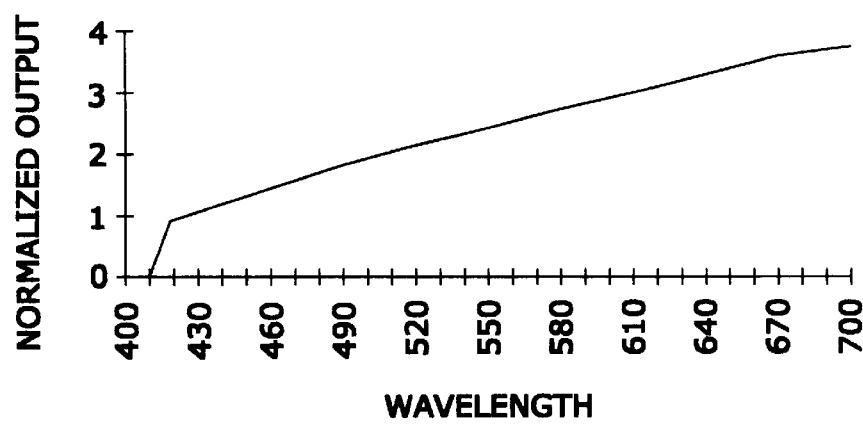

FIG. 4B is a graph of the amount of white light transmitted through the modified image. Thus, FIG. 4B reflects, e.g., the transmission required for the white sections 18 and 16 of flag 12. It is preferred to transmit substantially 100 percent of the light source in those portions of the image which correspond to white sections 18 and 16. However, one should only transmit so much of the light source in those portions of the image corresponding to white sections 18 and 16 so that the amount of radiant energy transmitted for the white objects is substantially the same as the amount of radiant energy transmitted for each of the red objects, the blue objects, etc. FIG. 4C is a graph of the light transmitted from the light source of FIG. 4A2 through the modified image which impacts the white sections 18 and 16. Inasmuch as 100 percent of the white light is being transmitted, the graph of FIG. 4C is substantially the same as the graph of FIG. 4A.

Figure 4D:
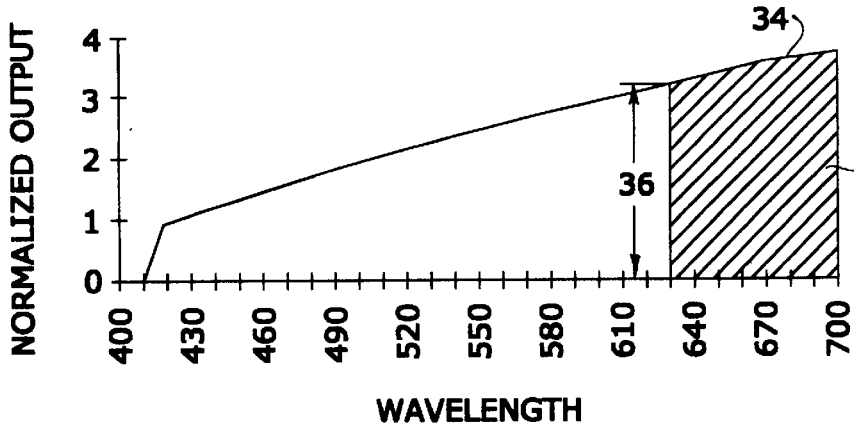
Figure 4D:
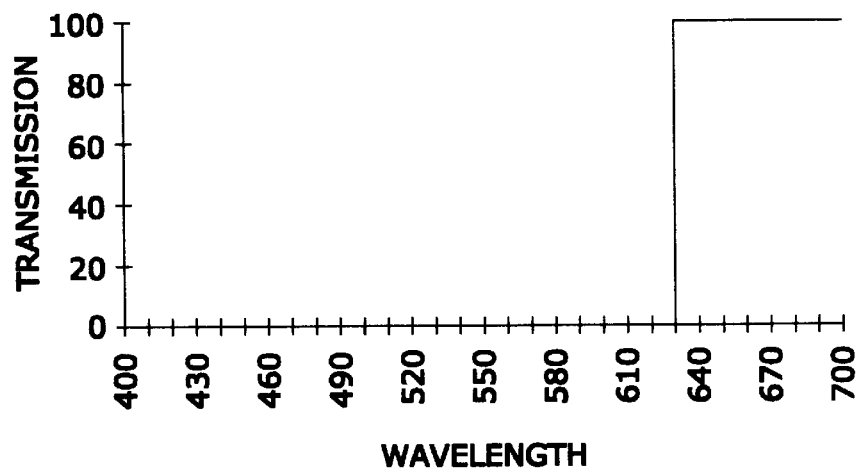

FIG. 4D is a graph of the amount of red light transmitted through the modified image corresponding to areas 14 in FIG. 2. As will be apparent from FIGS. 3 and 4D, only those portions of the red spectrum which exceed about 10 percent of the maximum reflectance are allowed to be transmitted; however, these portions are preferably transmitted at 100 percent to match the energy of the white light transmission. Since only a portion of the white light source of FIG. 4A1 is transmitted to the red portions 14, the graph of FIG. 4e indicates only that portion which has been so transmitted. It should be noted, however, that the slope 34, the height 36, and the area under the curve 38 are identical in the graphs of FIGS. 4A2 and 4E.

Figure 4E:
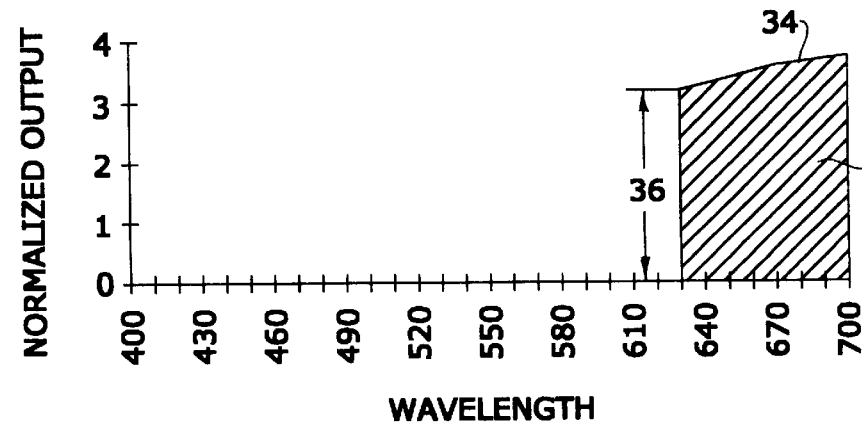
Figure 4F:
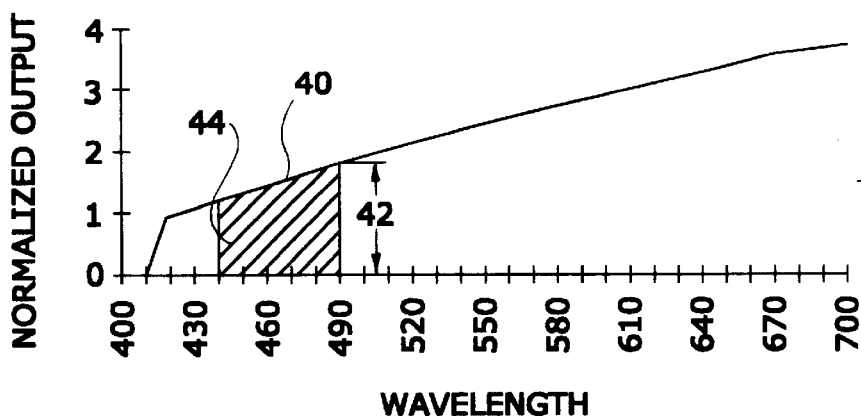
Figure 4F:
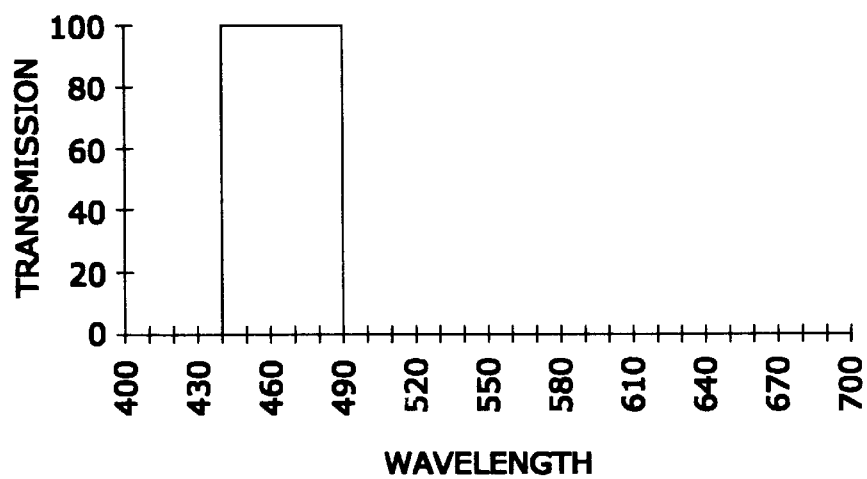

FIG. 4F is a graph of the amount of blue light transmitted through the modified image corresponding to area 20 in FIG. 2. In FIGS. 3 and 4F, only those portions of the blue spectrum which exceed about 10 percent of the maximum reflectance are allowed to be transmitted; however, these portions are preferably transmitted at 100 percent to match the energy of the white light transmission and the red light transmission. Since only a portion of the blue light source of FIG. 4A3 is transmitted to the blue portions 20, the graph of FIG. 4G indicates only that portion which has been so transmitted. It should be noted, however, that the slope 40, the height 42, and the area under the curve 44 are identical in the graphs of FIGS. 4A3 and 4G.

Figure 4G:
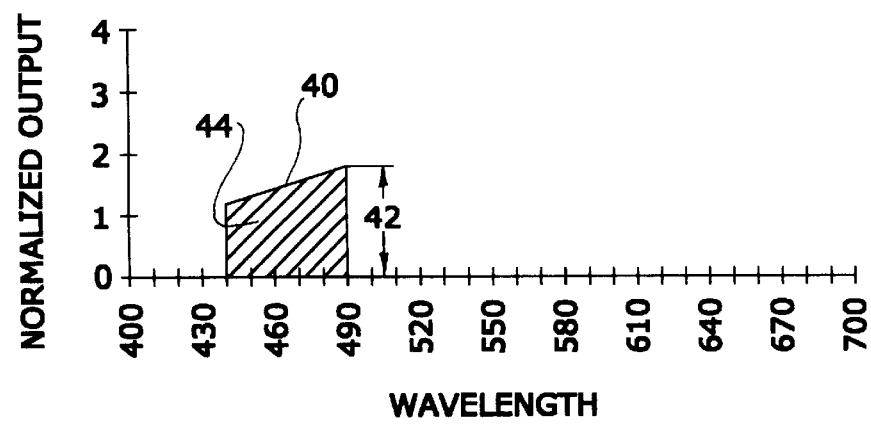

In each of the Graphs of FIGS. 4C, 4E, 4G, the heights of the curves are substantially identical to the corresponding heights in FIGS. 4A1, 4A2 and 4A3, thus, e.g., heights 36 are the same in FIGS. 4A2 and 4E, and heights 4A3 are the same in FIGS. 4A and 4G. This indicates that, in the embodiment depicted, 100 percent of the light in the designated wavelength regions is being transmitted. One may also use the areas under the curves, such as areas 38, to determine whether 100 percent of the light in the designated wavelength regions is being transmitted; and this latter method is preferred.

In an embodiment, not shown, where less than 100 percent of the light in the designated wavelength regions is being transmitted, then one must determine, for each significant wavelength region, that wavelength region which has the lowest percentage of light in the designated region being transmitted. Thereafter, one must then adjust the transmissions of the other wavelength regions to correspond to the lowest transmission.

Thus, by way of illustration, if it is determined that 100 percent of the white light, 75 percent of the red light, but only 50 percent of the blue light wavelength regions are being transmitted (as defined by the transmission curves depicted in FIGS. 4B. 4D, and 4F, discussed above), then one must modify the image so that transmissions for each wavlength region is 50 percent plus or minus 15.0 percent and, more preferably, 50 percent plus or minus 5.0 percent. In one embodiment, precisely 50 percent of each wavelength region is then transmitted.

As will be apparent to those skilled in the art, by this exercise one insures that the image of the artwork perceived by a viewer is substantially the same as the image perceived in the original light source; however, as will be apparent, substantial amounts of absorbed and potentially damaging light are eliminated.

When one has to modify the image so that the transmissions for a wavelength region are decreased, such as, e.g., when one goes from 75 percent to 50 percent transmission for the red wavelength region, one uses the image manipulation software to modify the area under the curve of the relevant wavelength region.

In addition to changing the portion of image transmitted, and/or the percentage of the image transmitted, one may additionally and/or alternatively change the size of one or more of the objects. Thus, referring to FIG. 2, it might be desired to make object 46 larger because it is often less visually objectionable to have white light spilling onto a blue surface than having blue light spilling onto a white surface.

Referring again to FIG. 1, and the in preferred embodiment depicted therein, in step 50 of the process the desired modified image is formed onto media. A mosaic image is fixed onto conventional media such as, e.g., color slides (which absorb unwanted light), dielectrically coated heat tempered glass (which reflects unwanted light), etc.

In one embodiment, the mosaic image is fixed upon a color slide by conventional means such as, e.g., those described in U.S. Pat. Nos. 5,276,779, 4,755,715, 5,403,705, 5,278,041, 4,553,882, 3,892,482, and the like. The disclosure of each of these United States patents is hereby incorporated by reference into this specification.

In another image, the mosaic image is fixed upon a dielectrically coated glass. Means of making such dielectrically coated glass structures are well known in the art and are described, e.g., in U.S. Pat. Nos. 5,705,135, 5,325,220, 5,265,115, 5,179,471, 4,769,221, 4,740,780, 4,586,819, and the like. The disclosure of each of these United States patents is hereby incorporated by reference into this specification.

When the dielectric image is to be fixed upon a dielectrically coated glass, it is preferred that the dielectric coatings have spectral properties which will allow for the transmissions depicted in FIGS. 4B, 4D, and 4F. In general, such coatings preferably are produced by sputtering materials such as silica, titanium dioxide, etc. onto a glass substrate.

In one embodiment, the coatings 642, 644, 646, and 648 discussed in column 21 of U.S. Pat. No. 5,666,017 may be used.

Regardless of whether the image is fixed into a color slide, or onto a dielectrically coated glass substrate, one may use conventional means of image fixation. Thus, by way of illustration and not limitation, one may use the image fixation techniques described in U.S. Pat. Nos. 5,809,910, 5,793,470, 5,739,898, 5,674,650, 5,673,101, 5,596,204, and the like. The disclosure of each of these United States patents is hereby incorporated by reference into this specification.

Referring again to FIG. 1, and in the preferred embodiment depicted therein, in step 52 the fixed mosaic image is then disposed within a projector. This step is described in more detail in FIG. 5.

Figure 5:
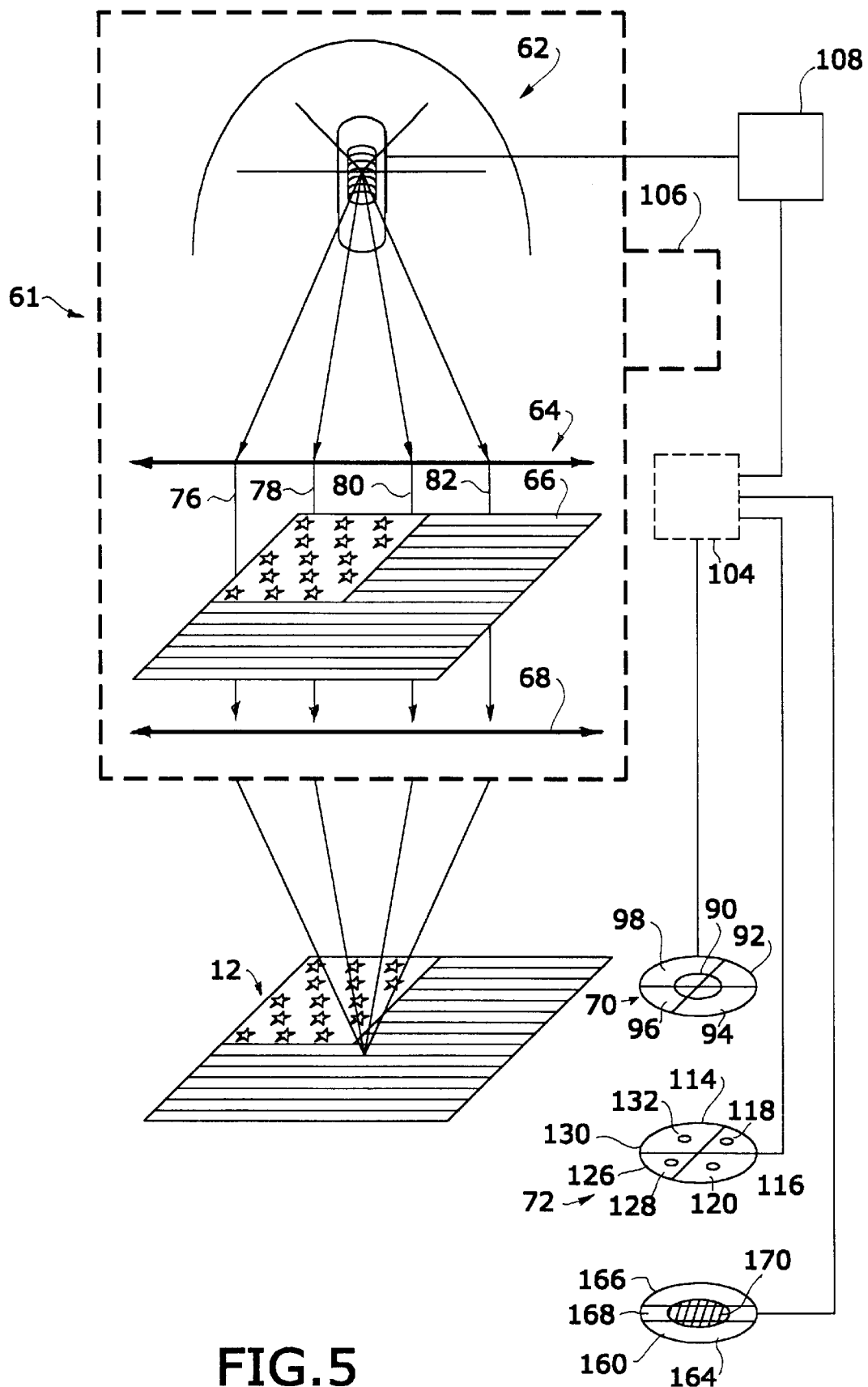
FIG. 5 is a schematic of one preferred apparatus of this invention for illuminating the modified image of FIG. 4 and for modifying the position of the spectral output produced thereby.

Referring to FIG. 5, and in the preferred embodiment depicted therein, it will be seen projector 61 is comprised of a light source 62, a condenser lens 64, modified image mosaic color slide 66, a projection lens 68, a first sensor 70, a second sensor 72, and means 106 for moving projector 61 in the X axis, the Y axis, the Z axis, and means for rotating projector 61 in the XY and the XZ axes. In the embodiment depicted, the modified image mosaic color slide 66 contains an image of flag 12 (see FIG. 2).

The light source 62 preferably is as disclosed elsewhere in this specification, with a color temperature of from about 3,300 to about 3,700 degrees Kelvin and limited energy in the infrared and ultraviolet regions. The light source 62 will be disposed at a distance from color slide 66 so that the desired light is focused upon art object.

In general, the distance of light source 62 from color slide 66 will depend upon condenser lens 64. It is desired to slightly overfill the condenser lens 64 with light so that color slide 66 is substantially and uniformly filled with light. Alternatively, the modified image can be designed to correct nonuniformities in the light source; thus, for example, if the center of the light source emits twice as much light as it edges, one may modify the image to rectify this imbalance.

One may use any of the conventional condenser lenses such as, e.g., those disclosed in U.S. Pat. Nos. 5,786,874, 5,743,611, 5,738,427, 5,735,283, 5,699,056, and the like.

The entire disclosure of each of these United States patents is hereby incorporated by reference into this specification.

Referring again to FIG. 5, the rays of light 76, 78, 80, and 82 passing through the condenser lens and transmitted through modified image mosaic color slide 66. Although a color slide is shown in the embodiment of this Figure, other media onto which the modified image of artifact 12 has been affixed may also be used.

The rays 76 et al. are transmitted through the color slide 66 and are then reimaged by lens 68, which preferably is a projection lens. It is preferred that projection lens 68 has multiple focus and zoom capabilities. One may use conventional projection lens devices such as, e.g., those disclosed in U.S. Pat. Nos. 5,825,466, 5,806,950, 5,788,365, 5,781,252, 5,777,804, 5,769,531, and the like. The entire disclosure of each of these United States patents is hereby incorporated by reference into this specification.

Referring again to FIG. 5, and in the preferred embodiment depicted therein, it will be seen that light detectors 70 and 72 are preferably disposed in a coplanar manner either adjacent to the flag 12 (as depicted in FIG. 5) or behind the flag 12 (not shown). As will be apparent to those skilled in the art, detectors 70 and 72 are preferably coplanar with flag 12 so that they experience substantially the same light exposure.

Light detectors 70 and 72 may be any conventional devices for detecting the intensity of light. Thus, by way of illustration, one may use one or more of the light detectors disclosed in U.S. Pat. Nos. 5,833,923, 5,828,458, 5,822,213, 5,812,251, 5,805,292, 5,793,356, 5,764,223, 5,760,900, 5,754,513, 5,731,213, and the like. The disclosure of each of these United States patents is hereby incorporated by reference into this specification.

In one preferred embodiment each of light detectors 70 and 72 is quad cell comprising four detectors. Such cells are well known; see, e.g., U.S. Pat. No. 5,469,193 which discloses a quad cell 44 with four light detectors.

Referring again to FIG. 5, and in the preferred embodiment depicted, it is preferred to so focus the light so that it impinges upon each of the light detectors in the quad cells. Thus, referring to FIG. 5, it will it be seen focused light 90 is partially focused in sections 92, 94, 96, and 98 of quad cell 70. As will be apparent, the amount of light focused in section 98 should be approximately equal to the amount of light focused in section 90, and the amount of light focused in section 96 should be approximately equal to the amount of light focused in section 94. The amount of light focused in section 98 minus the amount of light focused in section 94 should be substantially zero, but may be some finite amount x; the amount of light focused in section 96 minus the amount of light focused in section 92 should be substantially zero, but may be some finite amount y. In any event, for a given position of slide 66, there will be specified values for x and y.

As will be apparent, when slide 66 is moved, the corresponding light spot 90 moves, and the values of x and y thus will change.

Referring to FIG. 5, it will be seen that, after the mosaic image (such as, e.g.,, slide 66) is disposed in the projector 61, it is illuminated by the light source 62, thereby creating focused light spot 90 on quad cell detector 70. As will be apparent, the focused light spot 90 on quad cell detector 70 may be similar in intensity to the light projected onto the art object 12.

Referring again to FIG. 1, and in step 102 of the process depicted therein, the light focused upon the quad cell 70 measured once the projector 61 has been properly positioned, focused, and powered to give optimum illumination to the artwork. Thereafter, in step 102 after all the conditions necessary for optimum illumination have been achieved, a reading is taken in quad cell 70 of the optimum values for x and y.

Quad cell 70 continually monitors the illumination impact it, and reports its measured values to a controller 104 of a tilt stage 106. If, for any reason, the measured values of x and y vary from the optimum, the controller then will move the projector 61 in any or all of the x, y, z, xy, xz, etc. axes until the desired values of x and y are regained. This step is shown as step 110 in FIG. 1.

In the preferred embodiment depicted in FIG. 5, projector 61 is mounted on a tilt stage 106 which can move it in any of the desired directions. These tilt stages are well known to those skilled in the art and are described, e.g., in U.S. Pat. Nos. 5,831,739 and 5,182,615, the entire disclosures of which are hereby incorporated by reference into this specification. These tilt stages are readily commercially available from companies such as, e.g. Newport Research, Melles Griot, etc.

In addition to monitoring the position of projector 61, one may also monitor the total output of light source 62 reaching quad cell 70 (the total of the amounts of light reaching sections 92, 94, 96, and 98), and assign it a value z. If z changes, then it is likely that the power supplied to light source 62 has varied. In such a situation, controller 104 will change the operation of power supply 108. This step is shown as step 112 in FIG. 1.

For a given value of x, y, and z, the light source 62 will project light with a specified color temperature and spectral power distribution. As is known to those skilled in the art, the spectral power distribution will affect the color temperature. The desired color temperature preferably is within the range of from about 3,300 to about 3,700 degrees Kelvin.

When a light source, such as light source 62 degrades or becomes soiled or damaged, the color temperature of light it projects might change. Light detector 72 is adapted to detect when such change occurs by detecting a shift in the ratio of red and blue light being transmitted from light source 62. When light detector 72 is used in the process of this invention, it is preferred to underfill each of its detector areas 114, 116, 126, and 130 so that the spots of light focused therein do not intrude upon any adjacent areas.

Referring to FIG. 5, it will be seen that light detector 72, which may (but need not be) a quad cell is comprised of a red filter section 114 and a blue filter section 116. Into each of these sections is disposed a spot of white light from light source 62, denoted a light spots 118 and 120. When the illumination from light source 62 has been adjusted so that it is ideal in all of the aforementioned respects, the intensity of the red light component and the blue component are measured in detector 72, and identified as a and b. The ratio of a to b is an indicator of the color temperature of light source 62. When this ratio changes for a specified set of x, y, and z values, then this is an indication that there might be problem with light source 62 and that replacement of such light source should be considered.

Referring again to FIG. 5, in addition to continually monitoring the color temperature in step 122, one may also continually monitor the transmission characteristics of modified image mosaic color slide in step 124. Referring to FIG. 5, in addition to focusing white light spots 118 and 120 on sections 114 and 116 of quad cell 72, one may also focus a beam of red light on cell 126 to form a red spot 128, and abeam of blue light on cell 130 to form a blue spot 132. As will be apparent, one can measure the intensity of these red and blue beams of light when the conditions of illumination are ideal, and determine the ideal value c for the red light, and the ideal value d of the blue light. As will be apparent, the transmission through the modified image mosaic color slide 66 will vary as the quality of such media varies. When, e.g., the materials in such media degrade, one will obtain less than ideal values for c and d, and will be alerted to the possibility that slide 66 may be damaged.

Figure 6:
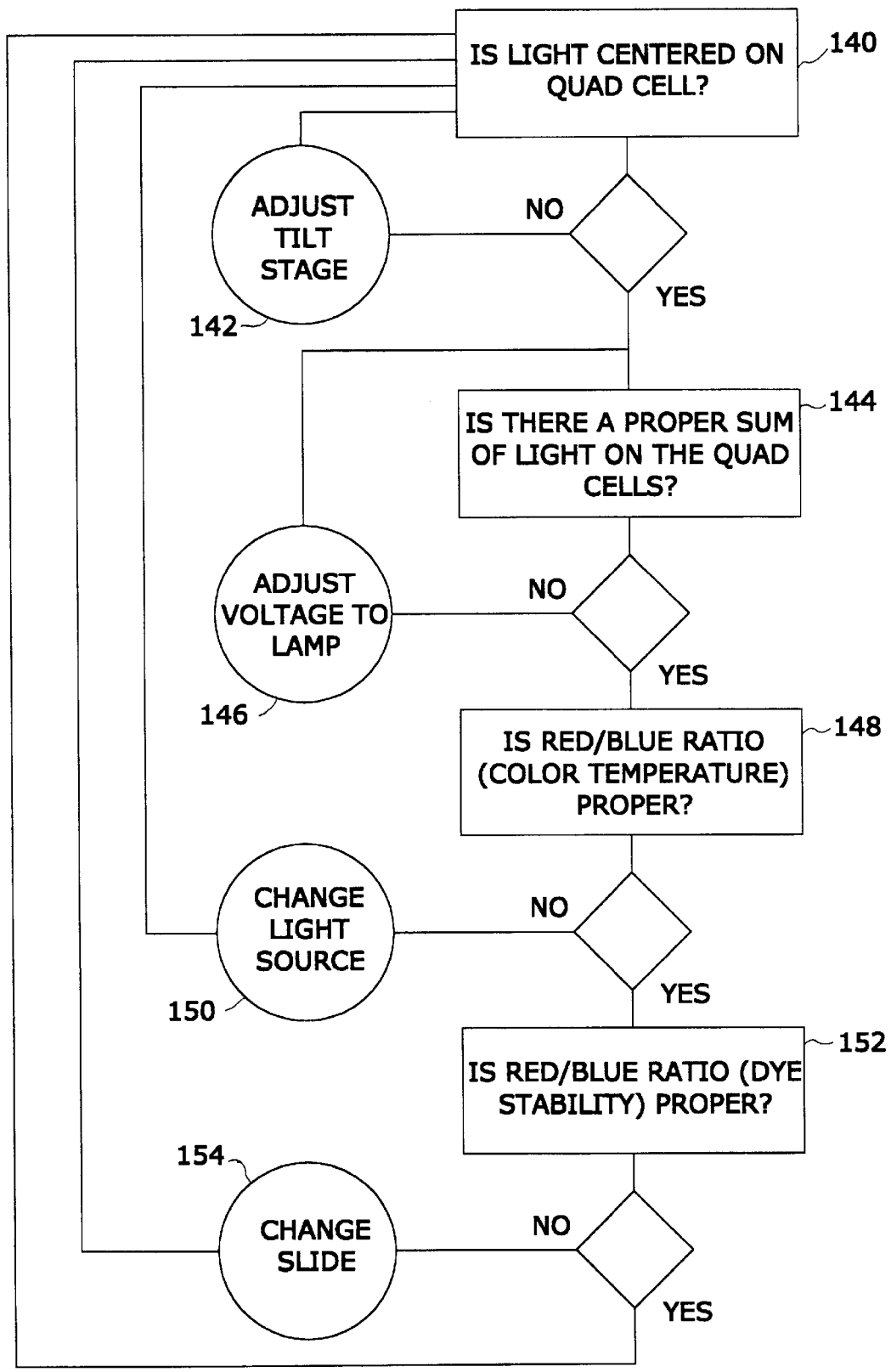
FIG. 6 is a flow chart illustrating how the apparatus of FIG. 6 is controlled.

FIG. 6 is a logic diagram which reflects the operations depicted in FIG. 5. Referring to FIG. 6, the controller 104 can determine, by reference to the readings 70, can determine in step 140 whether light is from the light source 62 is centered on the quad cell 70. If it is not so centered, one may adjust the tilt stage 106 in step 142.

Once the light has been centered on the quad cell 70, then in step 144 one determines (by reference to the readings from quad cell 70), whether there is a proper amount of total light shining onto the quad cell 70. If there is not, then in step 146, the controller 104 will communicate with the power supply 108 and in step 146 adjust the amount of power being finished to light source 62.

Once one has verified that the light source is adequately powered and focused/positioned, then in step 148 one determines whether the red/blue ratio of the light source 62 (its color temperature) is within the desired range by reference to quad cell 72 and, in particular, to sections 114 and 116 thereof. If the color temperature is not as desired, then in step 150 one can change the light source.

Once one has verified that the light source is adequately powered, is properly focused and positioned, and has the proper color temperature, then one can determine in step 152 whether the transmission through the mosaic medium 66 is proper by reference to sections 126 and 130 of quad cell 72. If the red/blue ratio being transmitted by such media is not proper, then in step 154 one can change the modified image mosaic color slide 66.

As will be apparent, controller 104 can continually monitor all of these conditions, correct some of them automatically, and alert one to the existence of problems with either the light source and/or the mosaic medium.

In one embodiment, not shown, when the controller 104 is aware of a defect in either the light source 62 and/or the mosaic medium 66, it is programmed to either cause the light source 62 to flash, blink, or turn off. Alternatively, or additionally, a suitable message may be posted upon a computer screen.

In another embodiment, illustrated in FIG. 5, a focus detector 160 is also disposed coplanarly with the detectors 70 and 72 and is adapted to determine whether the light rays from lamp 62 are in focus. One may use any conventional focus detector as detector 160. Thus, for example, one may use one or more of the focus detectors described in U.S. Pat. Nos. 5,825,043, 5,774,432, 5,764,381, 5,745,265, 5,734,938, 5,721,435, and the like. The disclosure of each of these United States patent applications is hereby incorporated by reference into this specification.

In the embodiment depicted in FIG. 5, and in step 162 of the process (see FIG. 1), once the optimal a, b, c, d, x, y, and z parameters have been set in accordance with the aforementioned disclosure, one may then measure the focus by detector 160 which preferably comprises a detector 164, a detector 166, and a gap 168 disposed therebetween. The light signal 170 impacting these detectors will vary in size as the focus varies. By monitoring the extents to which light signal impacts each of detectors 164 and 166, one can then monitor the focus of the lamp 62 and whether it has deviated from the optimum focus.

As will be apparent, the process of this invention may be used with other objects such as, e.g., rare documents (such as, e.g., the United States Constitution, the Magna Carta, etc.). With such documents, the print is usually of a substantially black color, which intensely absorbs light. Consequently, one could substantially eliminate absorption of light in the black areas of the document, thereby minimizing damage to the document without sacrificing any visual clarity.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention.

I claim:

1. A process for illuminating an object with a first spectrally distinct area, comprising the steps of:
    (a) determining the spectral reflectivity of said first spectrally distinct area,
    (b) identifying a first wavelength portion of such first spectrally distinct area that reflects more light from a light source than absorbs such light and the extent to which said first wavelength portions of such first spectrally distinct area reflect said more light than absorb said more light,
    (c) identifying the maximum reflectivity of said first wavelength portion of said first spectrally distinct area when illuminated with said light source,
    (d) identifying that portion of said first wavelength portion which has a reflectivity less than about a specified percentage of said maximum reflectivity,
    (e) preparing a digitized image of said first spectrally distinct area, thereby producing a first digitized image
    (f) modifying said digital image to delete said portion of said first wavelength portion which has a reflectivity less than said specified percentage of said maximum reflectivity, thereby producing a first modified digital image,
    (g) forming said first modified digital image onto a medium, thereby producing a modified image medium,
    (h) illuminating said modified image medium with said light source, thereby producing a first modified image, and
    (i) imaging said first modified image upon said object with an imager.

2. The process as recited in claim 1, wherein said light source provices a source of unfragmented light.

3. The process as recited in claim 2, wherein said unfragmented light is unfragmented white light.

4. The process as recited in claim 3, wherein said unfragmented white light has a color temperature of from about 3,300 to about 3,700 degrees Kelvin.

5. The process as recited in claim 4, wherein said light source provides light wherein:
    (a) less than about 1 percent of the radiant energy of said light is comprised of light with wavelengths of from about 280 to about 380 nanometers, and
    (b) less than about 20 percent of the radiant energy of said light is comprised of light with a wavelength of from about 780 to about 2,000 nanometers.

6. The process as recited in claim 1, wherein said object is artwork.

7. The process as recited in claim 1, wherein said specified percentage of said maximum reflectivity is about 50 percent.

8. The process as recited in claim 1, wherein said specified percentage of said maximum reflectivity is about 10 percent.

9. The process as recited in claim 1, wherein said specified percentage of said maximum reflectivity is about 5 percent.

10. The process as recited in claim 1, wherein said specified percentage of said maximum reflectivity is about 1 percent.

11. The process as recited in claim 1, further comprising the step of determining the position of said first modified image.

12. The process as recited in claim 11, wherein a light detector is used to determine the position of said first modified image.

13. The process as recited in claim 12, further comprising the step of moving said imager.

14. The process as recited in claim 13, wherein said imager is a projector, said projector is disposed upon a tilt table, and said tilt table is moved.

15. The process as recited in claim 11, wherein a light detector is used to determine the intensity of said first modified image.

16. The process as recited in claim 15, wherein a power supply is operatively connected to said light source, and wherein the power supplied to said light source is modified.

17. The process as recited in claim 11, wherein a light detector is used to determine the color temperature of said light source.

18. The process as recited in claim 11, wherein a focus detector is used to determine the focus of said light source.

19. The process as recited in claim 11, wherein a light detector is used to determine the transmission characteristics of said modified image medium.

20. The process as recited in claim 6, wherein:

(a) said artwork is further comprised of a second spectrally distinct area, (b) said process further comprises the steps of:

1. determining the spectral reflectivity of said second spectrally distinct area,
2. identifying a second wavelength portion of such second spectrally distinct area that reflects more light from a light source than absorbs such light and the extent to which said second wavelength portion of such second spectrally distinct area reflect said more light than absorb said more light,
3. identifying the maximum reflectivity of said second wavelength portion of said second spectrally distinct area when illuminated with said light source, and
4. identifying that portion of said second wavelength portion which has a reflectivity less than about a specified percentage of said maximum reflectivity of said second wavelength portion.

* * * * *